(12) United States Patent
Friesen et al.

(10) Patent No.: US 10,892,474 B2
(45) Date of Patent: *Jan. 12, 2021

(54) INTEGRABLE REDOX-ACTIVE POLYMER BATTERIES

(71) Applicant: Fluidic, Inc., Scottsdale, AZ (US)

(72) Inventors: Cody A. Friesen, Fort McDowell, AZ (US); Jose Antonio Bautista-Martinez, Mesa, AZ (US)

(73) Assignee: FORM ENERGY, INC., Somerville, MA (US)

(*) Notice: Subject to any disclaimer, the term of this patent is extended or adjusted under 35 U.S.C. 154(b) by 41 days.

This patent is subject to a terminal disclaimer.

(21) Appl. No.: 16/211,740

(22) Filed: Dec. 6, 2018

(65) Prior Publication Data

US 2019/0123340 A1 Apr. 25, 2019

Related U.S. Application Data

(63) Continuation of application No. 14/774,636, filed as application No. PCT/US2014/020874 on Mar. 5, 2014, now Pat. No. 10,256,460.

(Continued)

(51) Int. Cl.
   *H01M 4/137* (2010.01)
   *H01M 4/60* (2006.01)
   (Continued)

(52) U.S. Cl.
   CPC ............. *H01M 4/137* (2013.01); *B29C 45/00* (2013.01); *H01M 4/606* (2013.01); *H01M 4/608* (2013.01);
   (Continued)

(58) Field of Classification Search
   CPC .................................................. H01M 10/0565
   See application file for complete search history.

(56) References Cited

U.S. PATENT DOCUMENTS

| 4,265,789 A | 5/1981 | Christopherson et al. |
| 4,375,427 A | 3/1983 | Miller et al. |

(Continued)

FOREIGN PATENT DOCUMENTS

| EP | 0717418 A2 | 6/1996 |
| JP | 2005510886 A | 4/2005 |

(Continued)

OTHER PUBLICATIONS

U.S. Appl. No. 16/455,185.

(Continued)

*Primary Examiner* — Matthew J Merkling
(74) *Attorney, Agent, or Firm* — Withrow & Terranova, P.L.L.C.

(57) ABSTRACT

The disclosed technology relates generally to apparatuses and methods of fabricating solid-state electrochemical cells having redox-active polymers. In one aspect, an electrochemical cell comprises a negative electrode including a first redox-active polymer and configured to be reversibly oxidized during a discharging operation and further configured to be reversibly reduced during a charging operation. The electrochemical cell additionally comprises a positive electrode including a second redox-active polymer and configured to be reversibly reduced during the discharging operation and further configured to be reversibly oxidized during the charging operation. The electrochemical cell further comprises an electrolyte including a solid ion-exchange polymer, the electrolyte interposed between positive and negative electrodes and configured to conduct ions therebetween. The electrochemical cell is configured to store energy for an associated device or apparatus and further configured to provide structural features of the associated device or apparatus. The electrochemical cell may constitute a part of the casing, packaging or containment of the device.

17 Claims, 6 Drawing Sheets

Related U.S. Application Data

(60) Provisional application No. 61/776,364, filed on Mar. 11, 2013, provisional application No. 61/794,901, filed on Mar. 15, 2013.

(51) Int. Cl.
*H01M 10/05* (2010.01)
*H01M 10/0565* (2010.01)
*B29C 45/00* (2006.01)
*B33Y 10/00* (2015.01)
*H01M 4/02* (2006.01)

(52) U.S. Cl.
CPC ....... *H01M 10/05* (2013.01); *H01M 10/0565* (2013.01); *B33Y 10/00* (2014.12); *H01M 2004/027* (2013.01); *H01M 2004/028* (2013.01); *H01M 2300/0082* (2013.01)

(56) References Cited

U.S. PATENT DOCUMENTS

| | | | |
|---|---|---|---|
| 4,535,039 A | 8/1985 | Naarmann et al. | |
| 4,869,979 A | 9/1989 | Ohtani et al. | |
| 5,512,391 A | 4/1996 | Fleischer | |
| 5,569,708 A | 10/1996 | Wudl et al. | |
| 5,637,421 A * | 6/1997 | Poehler | H01M 4/60 205/58 |
| 5,700,398 A | 12/1997 | Angelopoulos et al. | |
| 5,731,105 A | 3/1998 | Fleischer et al. | |
| 5,776,587 A | 7/1998 | Angelopoulos et al. | |
| 5,840,443 A | 11/1998 | Gregg et al. | |
| 5,891,968 A | 4/1999 | Wudl et al. | |
| 5,916,486 A | 6/1999 | Angelopoulos et al. | |
| 5,922,466 A | 7/1999 | Angelopoulos et al. | |
| 5,938,979 A | 8/1999 | Kambe et al. | |
| 5,973,598 A | 10/1999 | Beigel | |
| 5,985,458 A | 11/1999 | Angelopoulos et al. | |
| 5,997,773 A | 12/1999 | Angelopoulos et al. | |
| 6,045,952 A | 4/2000 | Kerr et al. | |
| 6,300,015 B1 | 10/2001 | Nishiyama et al. | |
| 6,700,491 B2 | 3/2004 | Shafer | |
| 6,762,683 B1 | 7/2004 | Giesler | |
| 6,776,929 B2 | 8/2004 | Hossan et al. | |
| 6,899,974 B2 | 5/2005 | Kamisuki et al. | |
| 6,944,424 B2 | 9/2005 | Heinrich et al. | |
| 7,482,620 B2 | 1/2009 | Kugler et al. | |
| 7,675,123 B2 | 3/2010 | Leenders et al. | |
| 7,722,920 B2 | 5/2010 | Mickle et al. | |
| 7,911,345 B2 | 3/2011 | Potyrailo et al. | |
| 8,168,337 B2 | 5/2012 | Friesen et al. | |
| 8,260,203 B2 | 9/2012 | Brantner | |
| 8,309,259 B2 | 11/2012 | Friesen et al. | |
| 8,445,133 B2 | 5/2013 | Friesen et al. | |
| 8,481,207 B2 | 7/2013 | Friesen et al. | |
| 8,546,028 B2 | 10/2013 | Friesen et al. | |
| 8,895,197 B2 | 11/2014 | Friesen et al. | |
| 9,184,478 B2 | 11/2015 | Friesen et al. | |
| 9,236,643 B2 | 1/2016 | Friesen et al. | |
| 9,780,394 B2 | 10/2017 | Friesen et al. | |
| 9,882,215 B2 | 1/2018 | Johnson et al. | |
| 9,990,578 B2 | 6/2018 | Johnson et al. | |
| 10,090,520 B2 | 10/2018 | Friesen et al. | |
| 10,256,460 B2 | 4/2019 | Friesen et al. | |
| 10,374,236 B2 | 8/2019 | Friesen et al. | |
| 10,482,367 B2 | 11/2019 | Johnson et al. | |
| 2003/0230746 A1 | 12/2003 | Stasiak | |
| 2004/0214078 A1 | 10/2004 | Mitani et al. | |
| 2004/0256644 A1 | 12/2004 | Kugler et al. | |
| 2006/0102869 A1 | 5/2006 | Cavaille et al. | |
| 2006/0263697 A1 | 11/2006 | Dahn et al. | |
| 2007/0059901 A1 | 3/2007 | Majumdar et al. | |
| 2007/0176773 A1 | 8/2007 | Smolander et al. | |
| 2007/0235699 A1 | 10/2007 | Hossan et al. | |
| 2007/0238014 A1 | 10/2007 | Koshina et al. | |
| 2008/0286907 A1 | 11/2008 | Li et al. | |
| 2008/0303637 A1 | 12/2008 | Gelbman et al. | |
| 2009/0017342 A1 | 1/2009 | Friesen et al. | |
| 2009/0090907 A1 | 4/2009 | Kugler et al. | |
| 2009/0117574 A1 | 5/2009 | Labgold et al. | |
| 2009/0176162 A1 | 7/2009 | Exnar et al. | |
| 2009/0186254 A1 | 7/2009 | Murray | |
| 2010/0273063 A1 * | 10/2010 | Wallace | H01G 9/022 429/317 |
| 2011/0096388 A1 | 4/2011 | Agrawal et al. | |
| 2011/0221385 A1 | 9/2011 | Partovi et al. | |
| 2011/0300808 A1 | 12/2011 | Rokhsaz et al. | |
| 2012/0077084 A1 | 3/2012 | Christensen et al. | |
| 2012/0138357 A1 | 6/2012 | Lim et al. | |
| 2012/0206239 A1 | 8/2012 | Ikemoto | |
| 2013/0194148 A1 | 8/2013 | Fontecchio et al. | |
| 2013/0230771 A1 | 9/2013 | Deronzier et al. | |
| 2014/0038036 A1 | 2/2014 | Nishide et al. | |
| 2015/0310771 A1 | 10/2015 | Atkinson et al. | |
| 2015/0333331 A1 | 11/2015 | Johnson et al. | |
| 2016/0028070 A1 | 1/2016 | Friesen et al. | |
| 2016/0301077 A1 | 10/2016 | Huang et al. | |
| 2016/0350565 A1 | 12/2016 | Friesen et al. | |
| 2018/0260673 A1 | 9/2018 | Johnson et al. | |
| 2019/0036115 A1 | 1/2019 | Friesen et al. | |
| 2019/0123340 A1 | 4/2019 | Friesen et al. | |
| 2019/0205717 A1 | 7/2019 | Johnson et al. | |
| 2019/0276662 A1 | 9/2019 | Friesen et al. | |
| 2019/0355996 A1 | 11/2019 | Friesen et al. | |

FOREIGN PATENT DOCUMENTS

| | | |
|---|---|---|
| TW | I484683 B | 5/2015 |
| TW | 201829530 A | 8/2018 |
| WO | 97030445 A1 | 8/1997 |
| WO | 2008080075 A1 | 7/2008 |
| WO | 2009124249 A1 | 10/2009 |
| WO | 2009142848 A2 | 11/2009 |
| WO | 2010132357 A1 | 11/2010 |
| WO | 2011143368 A1 | 11/2011 |
| WO | 2013106122 A2 | 7/2013 |
| WO | 2013132106 A1 | 9/2013 |
| WO | 2014164150 A1 | 10/2014 |
| WO | 2015106132 A1 | 7/2015 |
| WO | 2015175553 A1 | 11/2015 |
| WO | 2015175556 A1 | 11/2015 |
| WO | 2018081165 A1 | 5/2018 |

OTHER PUBLICATIONS

Cardoso, Judith, et al., "Synthesis and Characterization of Zwitterionic Polymers with a Flexible Lateral Chain," Journal of Physical Chemistry, vol. 114, Jul. 2010, American Chemical Society, pp. 14261-14268.

Chae, Il Seok, et al., "Redox equilibrium of a zwitterionic radical polymer in a non-aqueous electrolyte as a novel Li+ host material in a Li-ion battery," Journal of Materials Chemistry A, vol. 1, Jul. 2, 2013, The Royal Society of Chemistry, pp. 9608-9611.

Chae, Il Seok, "Synthesis of Zwitterionic Redox-Active Radical Polymers and Their Application to an Organic Secondary Battery," PhD Thesis, Waseda University, Feb. 2013, 106 pages.

Ferrer-Vidal, Antonio, et al., "Integration of Sensors and RFID's on Ultra-ow-cost Paper-based Substrates for Wireless Sensor Networks Applications," IEEE Workshop on Wireless Mesh Networks, 2006, IEEE, pp. 126-128.

Golriz, Ali, et al., "Redox Active Polymer Brushes with Phenothiazine Moieties," ACS Applied Materials and Interfaces, vol. 5, Feb. 13, 2013, American Chemical Society, pp. 2485-2494.

Laschewsky, Andre, "Structures and Synthesis of Zwitterionic Polymers," Polymers, vol. 6, May 23, 2014, pp. 1544-1601.

Li, Z.H., et al., "Effect of zwitterionic salt on the electrochemical properties of a solid polymer electrolyte with high temperature stability for lithium ion batteries," Electrochimica Acta, vol. 56, Sep. 2010, Elsevier Ltd., pp. 804-809.

Potyrailo, Radislav, et al., "Battery-free radio frequency identification (RFID) sensors for food quality and safety," Journal of Agricultural and Food Chemistry, vol. 60, Issue 35, Sep. 5, 2013, 22 pages.

(56) References Cited

OTHER PUBLICATIONS

Song, Hyun-Kon, et al., "Redox-Active Polypyrrole: Toward Polymer-Based Batteries," Advanced Materials, vol. 18, Issue 13, 2006, pp. 1764-1768.
Song, Zhiping, et al., "Towards sustainable and versatile energy storage devices: an overview of organic electrode materials," Energy and Environmental Science, vol. 6, 2013, RSC Publishing, pp. 2280-2301.
Takashima, "Electroplasticity memory devices using conducting polymers and solid polymer electrolytes," Polymer International, vol. 27, Issue 3, 1992, pp. 249-253.
International Preliminary Report on Patentability for PCT/US2015/030412, dated Nov. 24, 2016, 7 pages.
International Preliminary Report on Patentability for PCT/US2015/030409, dated Nov. 24, 2016, 9 pages.
International Preliminary Report on Patentability for PCT/US2014/020874, dated Sep. 24, 2015, 8 pages.
International Search Report for PCT/US2015/010863, dated Apr. 22, 2015, 4 pages.
International Preliminary Report on Patentability for PCT/US2015/010863, dated Jul. 21, 2016, 14 pages.
Non-Final Office Action for U.S. Appl. No. 14/442,087, dated Jan. 23, 2017, 24 pages.
Final Office Action for U.S. Appl. No. 14/442,087, dated Aug. 8, 2017, 37 pages.
Non-Final Office Action for U.S. Appl. No. 14/442,087, dated Mar. 26, 2018, 44 pages.
Non-Final Office Action for U.S. Appl. No. 15/973,396, dated Jun. 28, 2018, 10 pages.
Non-Final Office Action for U.S. Appl. No. 14/710,509, dated Jun. 1, 2017, 7 pages.
Notice of Allowance for U.S. Appl. No. 14/710,509, dated Sep. 22, 2017, 7 pages.
Notice of Allowance for U.S. Appl. No. 14/710,367, dated Feb. 8, 2018, 8 pages.
Non-Final Office Action for U.S. Appl. No. 14/710,367, dated Sep. 22, 2017, 30 pages.
Non-Final Office Action for U.S. Appl. No. 14/710,367, dated Mar. 24, 2017, 19 pages.
Final Office Action for U.S. Appl. No. 14/442,087, dated Dec. 10, 2018, 45 pages.
Non-Final Office Action for U.S. Appl. No. 14/774,636, dated Oct. 20, 2017, 7 pages.
Final Office Action for U.S. Appl. No. 14/774,636, dated May 23, 2018, 5 pages.
U.S. Appl. No. 16/687,875, filed Nov. 19, 2019, Johnson et al.
Non-Final Office Action for U.S. Appl. No. 14/442,087, dated Jun. 28, 2019, 43 pages.
Non-Final Office Action for U.S. Appl. No. 16/299,884, dated Jun. 28, 2019, 14 pages.
Notice of Allowance and Examiner-Initiated Interview Sumary for U.S. Appl. No. 16/299,884, dated Aug. 23, 2019, 9 pages.
Final Office Action for U.S. Appl. No. 14/442,087, dated Mar. 6, 2020, 49 pages.
Advisory Action and AFCP 2.0 Decision for U.S. Appl. No. 14/442,087, dated May 8, 2020, 4 pages.
Non-Final Office Action for U.S. Appl. No. 14/442,087, dated Jun. 12, 2020, 58 pages.
Non-Final Office Action for U.S. Appl. No. 16/687,875, dated Jul. 10, 2020, 8 pages.
Notice of Allowance for U.S. Appl. No. 16/687,875, dated Oct. 1, 2020, 8 pages.

* cited by examiner

CA, Cell PAN-20Ω/PEO-LiClO$_4$ (10:1)/PAAQ-10%PAN(20Ω)
RE-CE PAN, WE PAAQ-PAN, 1.5V/500s to 0.8V/500s CV, Cell PAN-20Ω/PEO-LiClO$_4$ (10:1)/PAAQ-10%PAN(20Ω)
RE-CE PAN, WE PAAQ-PAN, 5mVs$^{-1}$

INTEGRABLE REDOX-ACTIVE POLYMER BATTERIES

CROSS-REFERENCE TO RELATED APPLICATION

This application is a continuation of U.S. patent application Ser. No. 14/774,636, filed Sep. 10, 2015, now U.S. Pat. No. 10,256,460, which is a national phase application of PCT Application PCT/US2014/020874, filed Mar. 5, 2014, which claims the benefit of U.S. Provisional Application No. 61/794,901, filed Mar. 15, 2013, and U.S. Provisional Application No. 61/776,364, filed Mar. 11, 2013, the contents of each of which are hereby incorporated by reference in their entireties.

BACKGROUND

Field of the Invention

The present application is related to electrochemical cells for storing energy and delivering power, and more particularly solid-state batteries comprising electrically conductive, redox-active polymers as active materials.

Description of the Related Art

Some conventional battery design approaches target volumetric energy density through a compartmentalized approach (i.e. the battery and the device powered by it considered as separate entities) which results in limited form factors (e.g. cylindrical, prismatic). While this rationale has produced compact electrochemical cells and enables the packaging optimization of batteries, the devices in which those batteries are disposed can be constrained in design and limited in form factor. In contrast to some conventional battery design approaches, design approaches that can allow a battery to be accommodated into or become the structure of the device itself can dramatically open up the design possibilities and potential capabilities of various technologies that employ batteries, especially in non-stationary applications (e.g. electric vehicles, personal electronics etc.). Unconventional battery designs have been proposed such as flexible batteries, textile batteries and microbatteries; however, adequate integration of batteries providing high energy densities has yet to be accomplished as challenges in design, manufacturing and battery chemistry and stability remain.

Some electrically conductive polymers and redox-active polymers are known in the art and numerous types and derivatives exist. As used herein, electrically conductive polymers refer to organic polymers that can include conjugated double bonds which provide electronic conduction properties (e.g. polyacetylene). In addition, redox-active polymers refer to polymers comprising functional groups capable of reversibly transitioning between at least two oxidation states wherein the transition between states occurs through oxidation (i.e. electron loss) and reduction (i.e. electron gain) processes. In addition to redox activity provided by the redox center, redox-active polymers may be electrically conductive through the polymer chain (e.g. polyaniline). For the purposes of the following description, the term "redox-active polymer" may be used interchangeably with the term "redox polymer."

SUMMARY

An embodiment described herein provides for an electrochemical cell comprising: a negative electrode comprising a redox-active polymer capable of being reversibly oxidized during the discharging operation and reversibly reduced during the charging operation; a positive electrode comprising a redox-active polymer capable of being reversibly reduced during the discharging operation and reversibly oxidized during the charging operation; an electrolyte comprising a solid ion-exchange polymer for conducting ions between the negative and positive electrodes; and wherein the electrochemical cell provides structural features of an associated device or apparatus.

Another embodiment described herein provides for a device or apparatus comprising at least one electrochemical cell, each electrochemical cell comprising: a negative electrode comprising a redox-active polymer capable of being reversibly oxidized during the discharging operation and reduced during the charging operation; a positive electrode comprising a redox-active polymer capable of being reversibly reduced during the discharging operation and oxidized during the charging operation; an electrolyte comprising a solid ion-exchange polymer for conducting ions between the negative and positive electrodes, wherein the at least one electrochemical cell provides structural features, packaging, casing or containment of the device.

Yet another embodiment described herein provides a method for manufacturing a three-dimensional device comprising at least one electrochemical cell, the method comprising: forming a negative electrode comprising a redox-active polymer capable of being reversibly oxidized during a discharging operation and reduced during a charging operation, in a pattern corresponding to the model; forming a solid ion-exchange polymer electrolyte for conducting ions between the negative electrode and a positive electrode, in a pattern corresponding to the model; forming the positive electrode comprising a redox-active polymer capable of being reversibly reduced during the discharging operation and oxidized during the charging operation, in a pattern corresponding to the model; repeating the foregoing acts to form successive layers.

These and other embodiments are described in greater detail below.

BRIEF DESCRIPTION OF THE DRAWINGS

Embodiments of the invention are described by way of example only, with reference to the accompanying drawings in which corresponding reference symbols indicate corresponding parts, and in which.

DETAILED DESCRIPTION

Figure 1:
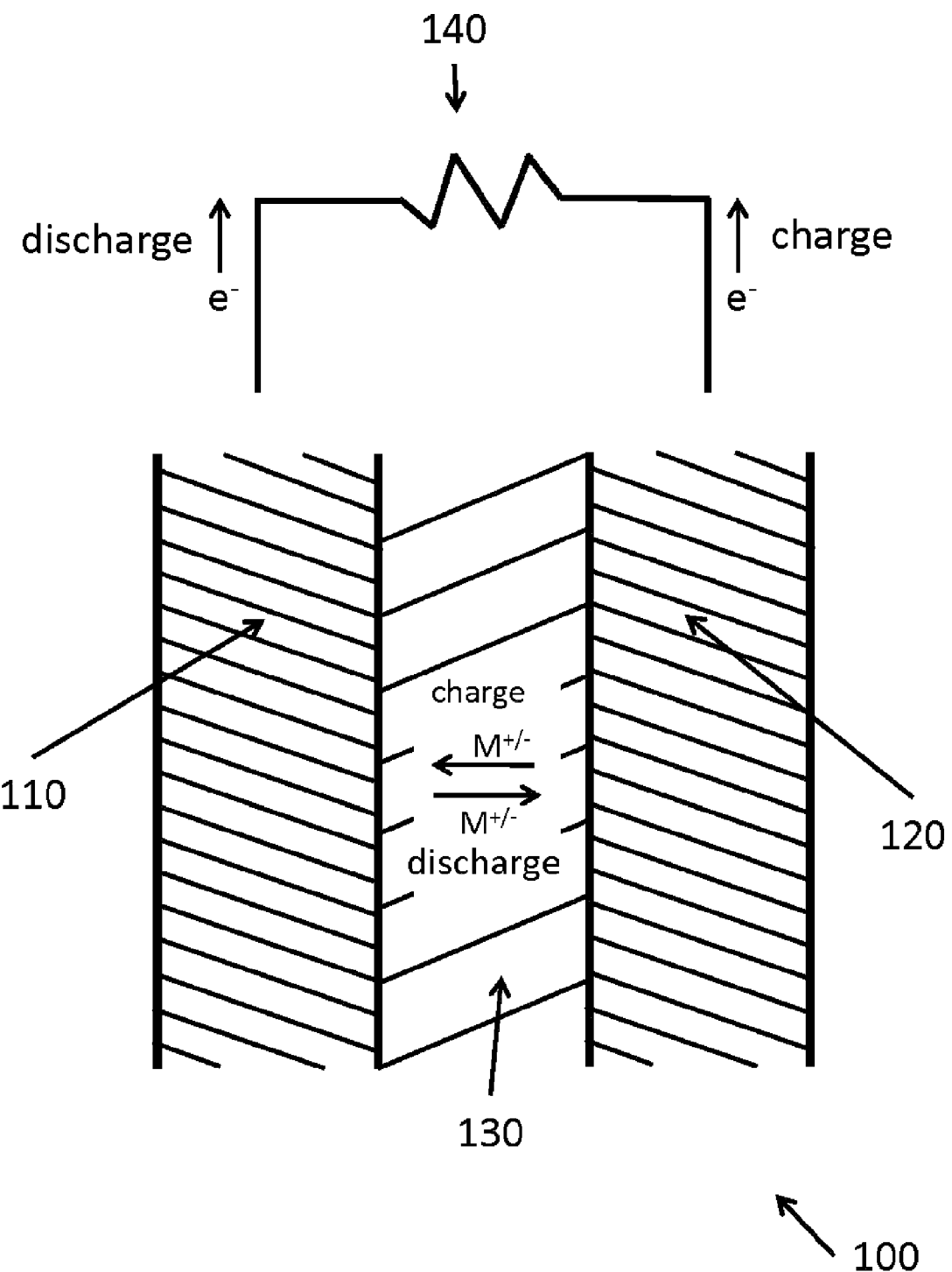
FIG. 1 is a schematic diagram of an integrable redox-active polymer cell according to some embodiments.

FIG. 1 is an illustrative diagram of the proposed electrochemical cell 100. The negative electrode, or anode 110, comprises a redox polymer having a standard redox potential Ea. The positive electrode, or cathode 120, comprises a redox polymer having a standard redox potential Ec wherein Ec can be more positive than Ea. A solid-state ion-exchange polymer electrolyte or ionically conductive polymer or gel 130 is formed between the anode 110 and cathode 120 permitting ionic conduction between anode 110 and cathode 120. During discharge, the oxidation half-reaction may take place at the anode 110. The electrons produced in the oxidation process at the anode 110 may flow through a load 140 (associated with the device or apparatus) and return to the cathode 120 to facilitate the reduction of the redox polymer at the cathode 120. During the charge process via an external power source, the redox polymer at the anode 110 is reduced and the redox polymer at the cathode 120 is oxidized.

In an embodiment, the thickness of the anode 110 and cathode 120 may be less than 200 µm, the ion-exchange polymer 130 may be less than 100 µm and the thickness of the cell 100 may be less than 500 µm. In another embodiment, the thickness of the anode 110 and cathode 120 may be less than 125 µm, the ion-exchange polymer 130 may be less than 50 µm and the thickness of the cell 100 may be less than 300 µm.

In an embodiment, the electrochemical cell 100 may comprise protective compounds adapted to protect redox polymers from over-charge and/or over-discharge. Over-discharge may result in irreversible reduction of a positive electrode redox polymer and/or irreversible oxidation of a negative electrode redox polymer. Likewise, over-charge may result in irreversible oxidation of a positive electrode redox polymer and/or irreversible reduction of a negative electrode redox polymer. For example, redox shuttles or any other suitable compounds may be reversibly reduced or oxidized instead of over-charging or over-discharging a redox polymer of the anode 110 or cathode 120. These protective compounds may be present in the negative electrode, positive electrode or a combination thereof. Non-limiting examples of protective compounds include phenothiazine, iodine, tri-iodine, quinones (e.g. benzoquinones, naphthoquinones, and anthraquinones), their derivatives and combinations thereof.

In an embodiment, a redox polymer may be included as a component of a copolymer and/or polymer blend. In addition to other properties, blending and/or copolymerization may improve the mechanical stability of the electrode during fabrication and/or during long-term charge-discharge cycling. Some non-limiting examples of copolymer or polymer blends are described below.

For example, a suitable polymer blend may be provided to enable thermoplastic manufacturing processes (i.e. thermoforming). For example, conductive polymers are generally not thermoplastics (i.e. thermoformable) so a plasticizer (e.g. esters of polycarboxylic acids, phthalate esters and so on) and/or other suitable additives that increase plasticity or fluidity may be included as a component of a co-polymer or polymer blend.

As another example, the redox-active polymer may have limited electrical conductivity alone. In an embodiment, a more conductive polymer may be blended or copolymerized with a redox-active polymer. In some embodiments, polymers with higher conductivities may also be redox polymers themselves. For example, linear-backbone "polymer blacks" like polyacetylene, polypyrrole, and polyaniline may provide increased electrical conductivity. Non-limiting examples include polyfluorenes, polyphenylenes, polypyrenes, polyazulenes, polynaphthalenes, polyacetylenes, polyphenylenevinylenes, polypyrroles, polycarbazoles, polyindoles, polyazepines, polyanilines, polythiophenes, polyphenylenesulfides, their derivatives and combinations thereof.

In some embodiments, it may be preferable to make the polymer film more porous in order to facilitate the ion exchange of the polymer redox states. Ionic conductivity of an electrode may be improved with the use of a suitable additive that can provide increased porosity within a polymer electrode. In some embodiments, the additive may be a component of a copolymer or polymer blend. For example, manufacturing methods that can increase the porosity of the polymer film include: incorporating bulky, contorted monomer structures resulting in inefficient polymer chain packing (e.g. tetrahedral monomers), blending a redox-active polymer with a second polymer which is soluble in a solvent, using gas phase foaming agents, using chemically decomposing foaming agents, inducing phase separation in the presence of non-solvents, applying shear stresses sufficient to cause fibril formation and coalescence or any other suitable method known in the polymer engineering arts.

As another example, the redox-active polymer may have limited mechanical stability alone. In an embodiment, a material providing increased mechanical stability may be blended or copolymerized with a redox-active polymer. For example, two polymers may be blended to provide improved fiber rheology resulting in a relatively high degree of mechanical stability. In some embodiments, a separate membrane with high mechanical stability may be provided in layers of the battery. As yet another example, a redox-active polymer may be blended with a polymer which provides improved adhesion to a substrate. In some embodiments, it may be desirable to improve adhesion to a current collector, separator and/or some feature of the associated device or apparatus.

In an embodiment, the redox polymers may be in contact with a conductive sheet or film to provide increased electrical conductivity and/or mechanical stability. This may be performed by any suitable method known in the art including lamination, film casting, film coating, electropolymerization, physical vapor deposition, and so on. For example, the redox polymer may be a metallized film wherein the redox polymer is coated on a thin layer of metal acting as a current collector. In some embodiments, the redox polymer may be in contact with a non-conductive sheet or film providing mechanical stability, as some feature of the device and/or as a general separator. In an embodiment, the system may comprise a plurality of electrochemical cells 100 formed in layers wherein the negative electrode or anode 110 of a first cell 100 is electrically connected to an anode of a second cell and the positive electrode or cathode 120 of the first cell 100 is electrically connected to a cathode of a third cell. Such a configuration may be repeated any suitable number of times and numerous other arrangements are also possible, depending on the specifics of the device, apparatus or system.

In an embodiment, the redox-active polymer battery may be provided as part of a composite. A component of the composite may provide a structural feature, mechanical strength and/or a function relevant to polymer battery operation. As a non-limiting example, a component of the composite may be a multifunctional carbon fiber composite. The multifunctional carbon fiber composite component may provide both mechanical stability to the device as well as provide a current collecting function associated with the redox-active polymer battery. Components of the composite may be formed of any suitable material (e.g. carbon, metal, glass and so on), any suitable shape (e.g. fibers, woven, whiskers, particles, and porous matrix, among other materials), and may also provide any suitable function (e.g. mechanical strength, electrical conduction, and/or ionic conduction, among other functions). For example, the composite may comprise carbon fiber, fiber glass, metal whiskers, carbon particles, and/or woven metals, among other materials.

In an embodiment, polymers may be synthesized by any suitable method known in the art, including but not limited to chemical oxidation or reduction, metal complex dehalogenation, metal complex coupling, step-growth polymerization, chain-growth polymerization, and electropolymerization, among other methods.

In an embodiment, the electrochemical cell 100 or plurality of electrochemical cells 100 and its associated device, apparatus or system (e.g. electric vehicles, consumer electronics etc.) may be manufactured by an injection molding process, additive manufacturing process and/or any other suitable manufacturing method. The electrochemical cell 100 may be designed as packaging, as a container, as a case, as structural elements of or any other suitable purpose related to an associated device, apparatus or system. For example, body panels of an electric vehicle or the case of a consumer device may comprise an all-polymer electrochemical cell or plurality of electrochemical cells. It may be appreciated that various embodiments described herein enables manufacturing of a device, apparatus, system or a component thereof with its associated power source collectively.

In an embodiment, the electrochemical cell 100 may provide structural features of any device or apparatus. The term "structural feature" is meant to encompass any physical attribute of a device or apparatus, in addition being the cell or power source for the device. The electrochemical cell itself, and thus structural features of the device or apparatus, may be free-standing, built into inner surfaces of the associated device or apparatus, provide exterior mechanical strength to the apparatus or any other suitable provision. Non-limiting examples of structural features of a device or apparatus will be described in the following paragraphs.

For example, in a typical electric vehicle, the lead-acid battery is just that—a battery—and provides no structural benefit to the vehicle other than providing power. However, as discussed below, if the battery could be integrated into an exterior or interior panel or some other component that serves an additional functional purpose in the vehicle structure, the battery would also be regarded as providing a structural feature.

Figure 2:
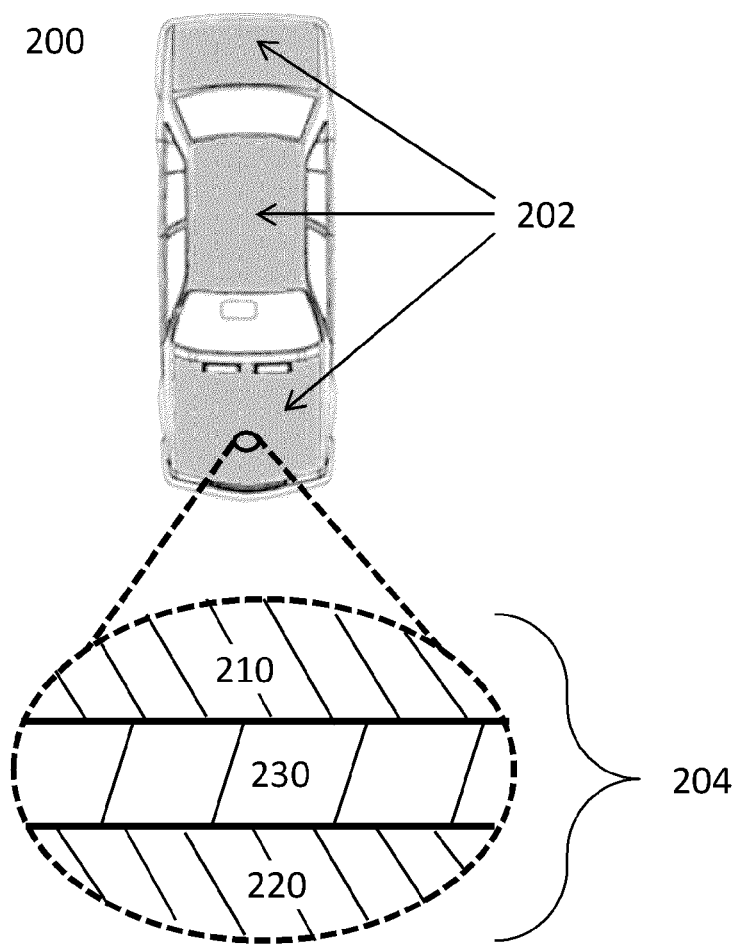
FIG. 2 is an illustration of a redox-active polymer battery integrated into an electric vehicle according to some embodiments.

As a non-limiting example, the redox-polymer battery may be formed into shapes to provide structural features of an electric vehicle. FIG. 2 is a simplified depiction of an electric vehicle 200 comprising multifunctional body panels 202. The multifunctional body panels 202 comprise a solid-state redox-active polymer cell 204, which may be, for example, built-into the body panels 202, according to an embodiment of the invention. The cell 204 comprises a solid-state ion-exchange polymer electrolyte 230 formed between a negative electrode 210 and a positive electrode 220 permitting ion exchange therebetween. During discharge, the oxidation half-reaction may take place at the negative electrode 210 operating as an anode. The electrons produced in the oxidation process at the negative electrode 210 may flow to a load associated with the electric vehicle 200 and return to the positive electrode 220 to facilitate the reduction of the redox polymer at the positive electrode 220 operating as a cathode. During the charge process, the redox polymer at the negative electrode 210 is reduced and the redox polymer at the positive electrode 220 is oxidized. In an embodiment, the panels 202 comprising the cell 204 may provide both vehicle structure and stored energy for propulsion. It may be appreciated that the large surface areas of the body panels 202 may facilitate manufacturing as well as provide cooling surfaces to prevent overheating of the cell 204, especially during vehicle motion. While the cell 204 is depicted as being a component of, or built into, body panels 202 in the illustrated example of FIG. 2, any other suitable part of an electric vehicle 200 may comprise the cells (e.g. consoles, fenders, spoilers, chassis, and internal structural members, among other parts). The properties of the system described herein permit various forms and shapes, which may not be achievable with current battery systems. While the embodiments described herein permit unrestricted forms, which may be relevant to multifunctional devices, batteries according to various embodiments may still be constructed in traditional geometries. It may be appreciated that the combination of traditional geometries and the polymer redox-active batteries described herein may substantially increase the energy content in various devices (e.g. electric vehicles, personal electronics and so on).

In an embodiment, the redox-active polymer battery may be formed collectively with the associated device or apparatus. The term "collectively" is meant to encompass any manufacturing process in which the polymer battery is not formed independently. In an embodiment, the components of the cell, any support matrix and any other feature of the device or apparatus may be injection molded together. In some embodiments, the components of the cell, any support matrix and any other feature of the device or apparatus may be formed by an additive manufacturing technique (e.g. three-dimensional printing).

In an embodiment, additive manufacturing techniques may be employed to produce a three-dimensional redox-active polymer battery with its associated device or apparatus in virtually any shape. For example, a digital model of the device or apparatus may be designed and successive layers may be laid down in a pattern corresponding to the model. For example, each layer may comprise a negative electrode, a positive electrode, an electrolyte, a separator, a support matrix, a current collector or any other feature of the device or apparatus.

Figure 3:
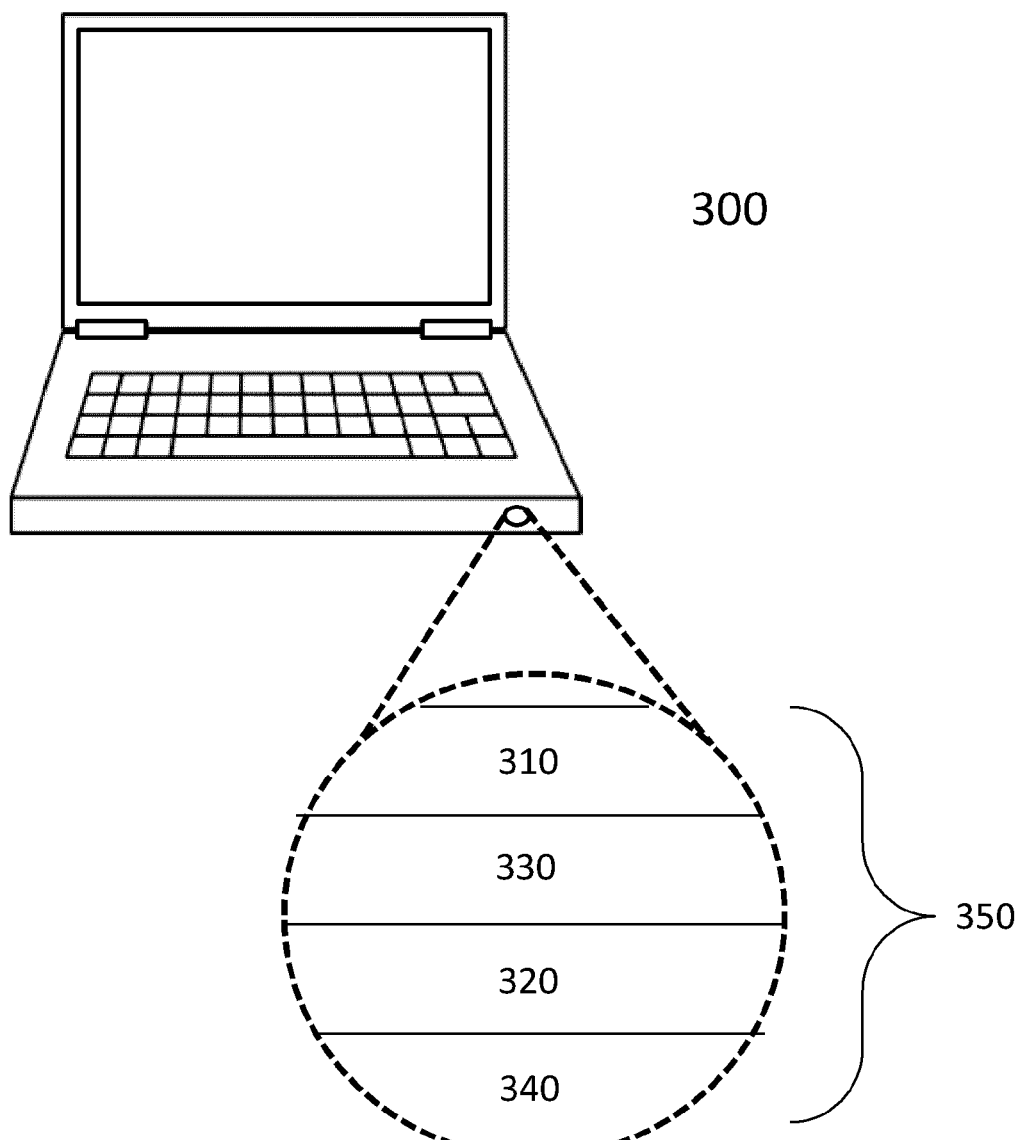
FIG. 3 is an illustration of a laptop computer comprising a redox-active polymer battery according to some embodiments.

As another example, the polymer battery may provide a protective casing, keyboard or other physical component of a personal electronic device, such as a laptop computer, a desktop computer, a smart phone, a tablet personal computer, a personal digital assistant, a wearable device and other similar personal electronic devices. In the illustrated example in FIG. 3, a laptop computer 300 comprises a redox polymer battery forming a laptop casing wherein a negative electrode 310 is coupled to a positive electrode 320 with an ion-exchange polymer 330 therebetween. In some embodiments, an electrically insulating separator 340 or any suitable support matrix may be employed to allow the cell 350 to be repeatedly layered. For example, the cell 350 may be extruded in a thermoforming process to form a sheet which may then be repeatedly folded or otherwise manipulated to form the casing of the laptop 300. Such a configuration may be repeated any suitable number of times and numerous other arrangements are also possible, depending on the specifics of the device, apparatus or system.

In an embodiment, the polymer may comprise dopants modifying the electrical conductivity or other properties. The dopants may be incorporated into the redox polymers by any suitable method. For example, the dopants may include charged species which may be incorporated during electrochemical oxidation and/or reduction processes. In a feature of an embodiment, oxidative and/or reductive doping may improve the electrical conductivity of the redox polymer. In some embodiments, the redox polymer may be activated before or after assembling the cell 100 (FIG. 1). For example, the redox polymer may be oxidized or reduced before integration into cell 100 in an ionically conductive medium comprising preferred dopant species, if any.

In an embodiment, the redox polymer structure may comprise an electrically conductive polymer backbone with functional side groups having redox activity. In some embodiments, the redox polymer may have a structure wherein the preferred redox-active groups can be part of a main electrically conductive polymer chain. The redox-active group can exist in at least two oxidation states. In an embodiment, redox-active groups of the organic polymer may comprise cyclic or acyclic heteroatoms including but not limited to O, S, N, P, transition metals, metallocenes and combinations thereof. For example, the redox-active groups may include cyclic, polycyclic and/or acyclic structures comprising alkanes, alkenes, benzenes, styrenes, alcohols, ketones, esters, ethers, amines, amides, imines, imides, alkylamines, pyridines, thiols, thiophenes, thiones, thials, phenothiazines, sulfides, sulfoxides, phosphines, phosphones, halides, quinones, their derivatives and combinations thereof.

In an embodiment, the electrically conductive polymer backbone may comprise groups selected from the group consisting of: polypyrrole, polyaniline, polydiphenylamine, poly(o-phenyldiamine), polythiophenes, poly(3,4-ethylenedioxythiophene), polyphenazines, polycarbazoles, polyfluorenes, polyindoles, polyphenylenes, polypyrenes, polyazulenes, polynaphthalenes, polyazepines, poly(p-phenylene sulfide), derivatives and combinations thereof.

In an embodiment, the redox-active group may form quinoid structures. For example, structures may include benzoquinones, naphthoquinones, anthraquinones, hydroquinones, aminoquinones, polyvinylquinones, polycyclic quinones, their derivatives or combinations thereof.

As an example, the polymer may include poly-chloranil-pyrrole, with the pyrrole backbone and the chloranil quinoid as the redox-active part, which has the structure depicted below.

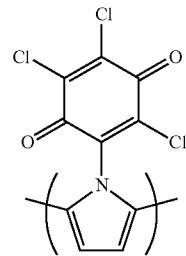

In an embodiment, pairs of redox polymers are selected to maximize the potential difference between the cathode redox polymer potential Ec and the anode redox polymer potential Ea. As non-limiting examples, the redox polymer at the anode 110 may comprise polyaniline, poly(aminoanthraquinone), polyvinylanthraquinone, poly(1-aminoanthraquinone), poly(3,7-dialkylbenzo [1,2-b:4,5-b']dithiophene-4,8-dione-2,6-diyl), or combinations thereof. These redox polymers at the anode 110 may be paired to redox polymers at the cathode 120 such as but not limited to poly(1-naphthol), poly(10-hexylphenothiazine-3,7-diyl), or combinations thereof.

According to various embodiments, redox polymer pairs and estimates of associated properties are provided in Table 1. The redox polymers may be selected to maximize the potential difference between the cathode (positive electrode) redox polymer potential Ec and the anode (negative electrode) redox polymer potential Ea. Additionally, the redox polymer pairs may be selected to maximize the associated cell potential, specific energy and/or energy density of the system. It will be appreciated that the redox polymer pairs provided in Table 1 represent examples and are not intended to be limiting, but instead demonstrate the ability to tune the properties of the redox-active polymer battery by careful selection of redox polymer pairs.

TABLE 1

| Negative Electrode | Positive Electrode | Ea (V vs Ag/AgCl) | Neg. Electrode Capacity (Ah/kg) | Ec (V vs Ag/AgCl) | Pos. Electrode Capacity (Ah/kg) | Cell OCP (V) | Specific Energy (Wh/kg) | Energy Density (Wh/L) |
|---|---|---|---|---|---|---|---|---|
| Poly(aminoanthraquinone) | Poly(10-hexylphenothiazine-3,7diyl) | −0.7 | 240 | 0.8 | 189 | 1.5 | 146 | 175 |
| Poly(aminoanthraquinone) | poly-1-naphthol | −0.4 | 240 | 1.3 | 186 | 1.7 | 146 | 176 |
| polyaniline | poly-1-naphthol | −0.1 | 288 | 1.3 | 186 | 1.4 | 136 | 171 |
| polyanthraquinone | poly-1-naphthol | −0.9 | 258 | 1.3 | 186 | 2.2 | 197 | 236 |
| Poly(3,7-dialkylbenzo[1,2-b:4,5-b']dithiophene-4,8-dione-2,6-diyl) | Poly(10-hexylphenothiazine-3,7diyl) | −1.1 | 244 | 0.8 | 189 | 1.9 | 166 | 199 |
| Poly(3,7-dialkylbenzo[1,2-b:4,5-b']dithiophene-4,8-dione-2,6-diyl) | poly-1-naphthol | −1.1 | 244 | 1.3 | 186 | 2.4 | 208 | 250 |
| polyvinylanthraquinone | Poly(10-hexylphenothiazine-3,7diyl) | −0.8 | 238 | 0.8 | 189 | 1.6 | 138 | 166 |
| polyvinylanthraquinone | poly-1-naphthol | −0.8 | 238 | 1.3 | 186 | 2.1 | 180 | 216 |

In an embodiment, the charge carriers exchanged by the ion-exchange polymer electrolyte 130 may be selected based on redox polymer chemistry, preferred ions exchanged or other suitable chemical and/or mechanical properties. Non-limiting examples of ions that may be exchanged include positive ions (e.g. $H+$, $Li+$, $Na+$, $K+$, $R_4N+$, etc.), negative ions (e.g. $OH-$, $ClO_4-$, $Cl-$, $BF_4-$, $SbF_6-$, $HCO_3-$, $CF_3SO_3-$, $(CF_3SO_2)_2N-$ etc.) or a combination thereof. Non-limiting examples of ion exchange polymers include polyethylene oxide (PEO), poly(siloxanes-g-oligo(ethylene oxide)), poly(trimethylene carbonate), poly(oxymethylene), poly(propylene oxide), poly(oxymethylene-oligo-oxyethylene), poly(dimethyl siloxane).

Non-limiting examples of electrolyte compositions and estimated conductivities are provided in Table 2.

TABLE 2

| Polymer Backbone | Ionic Compound | Conductivity (S/cm) |
|---|---|---|
| Poly(trimethylene carbonate) | Lithium Hexafluoroantimonate | 1E-05 |
| Poly(siloxanes-g-oligo(ethylene oxide)) | Lithium Triflate | 7E-04 |
| Polyethylene oxide | Lithium Perchlorate | 5E-04 |
| Polyethylene oxide | Potassium Bicarbonate | 5E-07 |

It will be appreciated that the compositions provided in Table 2 represent examples and are not intended to be limiting, but instead demonstrate the ability to tune the properties of the ion-exchange materials by selection of both polymer backbone and ionic compound. In some embodiments, a composite solid electrolyte may be employed wherein a filler is used to decrease the interaction between the ions in the electrolyte and the polymeric chains. Not to be bound by any particular theory, but if this interaction is too strong, the ionic mobility and ionic conductivity in the electrolyte may decrease. Non-limiting examples include: polyethylene oxide (PEO)-potassium nitrate ($KNO_3$) electrolyte filled with silicon oxide ($SiO_2$) particles, polyethylene oxide (PEO)-lithium bis(trifluoromethanesulfonimide) ($Li(CF_3SO_2)_2$) filled with barium titanate ($BaTiO_3$), or polyethylene oxide (PEO)-lithium perchlorate ($LiClO_4$) filled with aluminum oxide ($Al_2O_3$). These examples are not intended to be limiting, as numerous other combinations are also possible.

Figure 4:
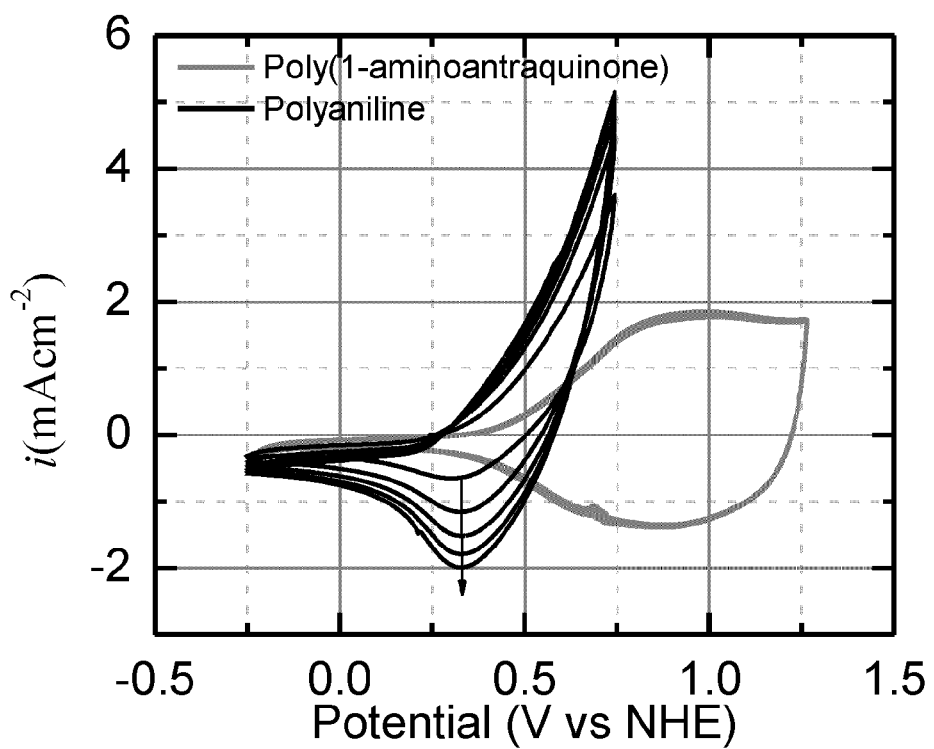
FIG. 4 illustrates cyclic voltammograms for poly(1-amino-anthraquinone) (PAAQ, gray line) and polyaniline (PAN, black line) in 0.2M $LiClO_4$/Acetonitrile, according to some embodiments.

As a non-limiting experimental example, FIG. 4 shows cyclic voltammograms for poly(1-amino-anthraquinone) (PAAQ, gray line) and polyaniline (PAN, black line) in an electrolyte solution of 0.2M lithium perchlorate ($LiClO_4$)/acetonitrile (ACN) with a scan rate of 0.02 $Vs^{-1}$. The negative electrode and positive electrodes cast onto Pt foils and electrically connected to a potentiostat. It may be appreciated that PAAQ has already been observed to provide stable cycling up to 750 cycles and PAN has already been observed to provide stable cycling up to 500 cycles. These tests represent half-cell experiments that exhibit a high degree of cycling stability.

Figure 5A:
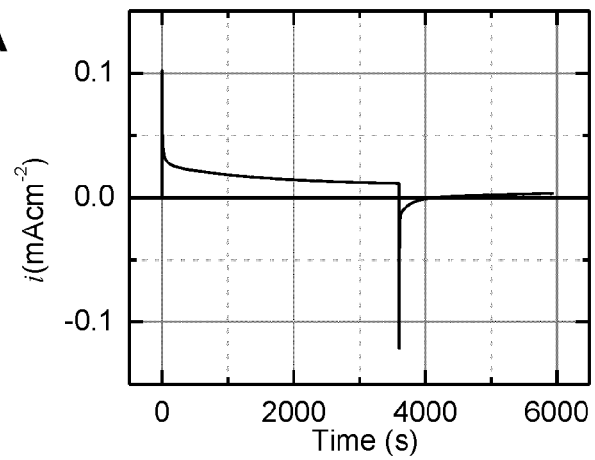
FIG. 5A is a chronoamperogram and FIG. 5B is a cyclic voltammogram associated with a solid-state redox-active polymer battery, according to some embodiments.
Figure 5B:
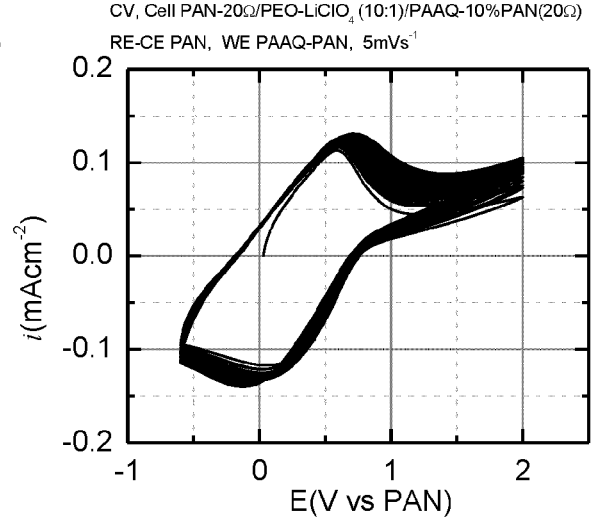

As a non-limiting experimental example, a solid-state redox-active polymer cell similar to the electrochemical cell 100 (FIG. 1) was produced with a negative electrode comprising polyaniline (PAN), a positive electrode comprising polyaminoanthraquinone (PAAQ) and an ion-exchange material comprising polyethylene oxide (PEO) and lithium perchlorate ($LiClO_4$) (10:1 PEO:$LiClO_4$) formed therebetween. The combined thickness of the three polymer layers was provided in the range of 125-150 μm. The negative electrode and positive electrodes were electrically connected to a potentiostat with the use of copper tape. The PAN electrode was connected to reference and counter electrode terminals of the potentiostat and the PAAQ electrode acted as the working electrode. FIG. 5A exhibits a chronoamperogram resulting from charging the cell at 1.5V vs PAN for 3600 seconds followed by discharging the cell at 0.8V vs PAN for 2400 seconds. During the charging step, a current of around 15 $\mu Acm^{-2}$ was sustained. After 3600 seconds, a discharging current of short duration (500 seconds) was observed, after which the current became positive. In some embodiments, it may be beneficial to "activate" the PAN electrode before assembly in order to "pre-oxidize" the PAN polymer. In the charging cycle, the PAN polymer is reduced and the PAAQ polymer is oxidized, however, at the outset of this experiment, the PAN polymer was already in a reduced state which may in turn be limiting the discharge current. FIG. 5B exhibits a cyclic voltammogram performed at 5 $mVs^{-1}$ scan rate. The cyclic voltammogram is associated with the electrochemical behavior of the PAAQ polymer electrode which exhibits stable redox activity over 40 consecutive cycles.

In some embodiments, the pair of redox polymers comprising the anode-cathode pair and the ion-exchange polymer electrolyte can be configured to have a gravimetric energy density of at least 50 Wh/kg, and preferably greater than 100 Wh/kg, and a volumetric energy density of at least 100 Wh/L, and preferably greater than 150 Wh/L. Preferably, the battery can maintain its performance level over at least 100 charge/discharge cycles, with no more than a 10% decrease, and preferably no more than a 5% decrease, in average power output between a fully charged state and a fully depleted state. More preferably, the battery can maintain that performance level over at least 1000 charge/discharge cycles.

Figure 6:
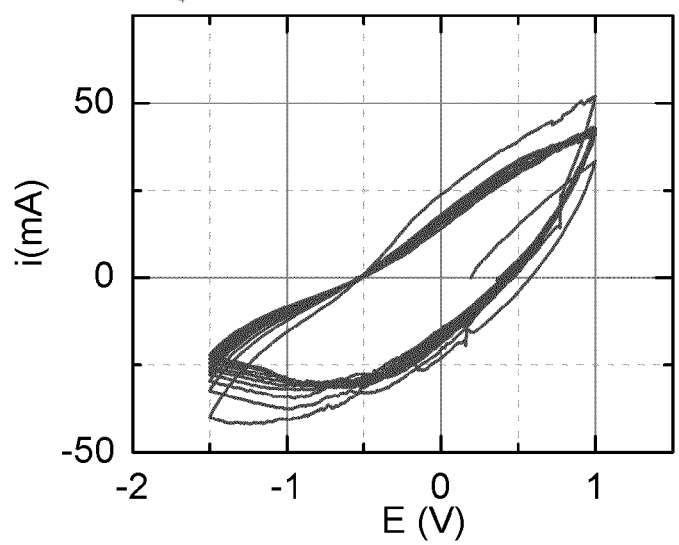
FIG. 6 is a cyclic voltammogram associated with polypyrrole-chloranil as the redox-active polymer of the battery, according to some embodiments.

FIG. 6 is a cyclic voltammogram associated with poly-pyrrole-chloranil as the redox-active polymer of the battery, according to some embodiments. The poly-pyrrole-chloranil polymer film is reversibly cycled between -1.5 to 1 volt in an electrolyte solution of 0.2M LiClO4 in acetonitrile (ACN).

As used herein, the term solid refers to a material solid at standard conditions (1 atm, 20° C.). Thus, the redox-active polymers and the electrolyte herein are each solid and electrochemically functioning at standard conditions.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. A device comprising at least one electrochemical cell, the at least one electrochemical cell comprising:
   a negative electrode layer comprising a first redox-active polymer and configured to be reversibly oxidized during a discharging operation and further configured to be reversibly reduced during a charging operation;
   a positive electrode layer comprising a second redox-active polymer and configured to be reversibly reduced during the discharging operation and further configured to be reversibly oxidized during the charging operation, wherein the second redox-active polymer includes one or both of poly(1-naphthol) and poly(10-hexylphenothiazine-3,7-diyl); and
   an electrolyte layer comprising a solid ion-exchange polymer, the electrolyte layer interposed between the positive electrode layer and the negative electrode layer and configured to conduct ions therebetween, wherein the at least one electrochemical cell is configured to store energy for an associated device and further configured to provide structural features of the associated device; and wherein at least one of the positive electrode layer or the negative electrode layer comprises a protective compound adapted to protect at least one of the first redox-active polymer or the second redox-active polymer from over-charging or over-discharging, and the protective compound is selected from the group consisting of a phenothiazine, iodine, tri-iodine, benzoquinone, naphthoquinone, and anthraquinone, their derivatives and combinations thereof.

2. The device of claim 1, wherein a thickness of each of the positive electrode layer and the negative electrode layer is less than 200 μm.

3. The device of claim 1, wherein a thickness of the electrolyte layer is less than 100 μm.

4. The device of claim 1, wherein a total thickness of the at least one electrochemical cell is less than 500 μm.

5. The device of claim 1, wherein the solid ion-exchange polymer comprises at least one of polyethylene oxide (PEO), poly(siloxanes-g-oligo(ethylene oxide)), poly(trimethylene carbonate), poly(oxymethylene), poly(propylene oxide), poly(oxymethylene-oligo-oxyethylene), or poly(dimethyl siloxane).

6. The device of claim 1, wherein at least one of the first redox-active polymer or the second redox-active polymer includes a quinoid structure.

7. The device of claim 1, wherein the first redox-active polymer is selected from the group consisting of polyaniline, poly(aminoanthraquinone), polyvinylanthraquinone, poly(1-aminoanthraquinone), poly(3,7-dialkylbenzo [1,2-b:4,5-b']dithiophene-4,8-dione-2,6-diyl), or combinations thereof.

8. The device of claim 1, wherein at least one of the positive electrode layer or the negative electrode layer comprises a polymer blend.

9. The device of claim 1, wherein at least one of the positive electrode layer or the negative electrode layer further comprises a structural material in the form of at least one of fibers, a woven material, whiskers, particles, or a porous matrix such that the at least one electrochemical cell is configured to provide mechanical stability to the device.

10. The device of claim 9, wherein the structural material comprises at least one of carbon, metal, or glass.

11. A device comprising at least one electrochemical cell, the at least one electrochemical cell comprising:

a negative electrode layer comprising a first redox-active polymer and configured to be reversibly oxidized during a discharging operation and further configured to be reversibly reduced during a charging operation, wherein the first redox-active polymer is selected from the group consisting of polyaniline, poly(aminoanthraquinone), polyvinylanthraquinone, poly(1-aminoanthraquinone), poly(3,7-dialkylbenzo [1,2-b:4,5-b']dithiophene-4,8-dione-2,6-diyl), and combinations thereof;

a positive electrode layer comprising a second redox-active polymer and configured to be reversibly reduced during the discharging operation and further configured to be reversibly oxidized during the charging operation, wherein the second redox-active polymer includes one or both of poly(1-naphthol) and poly(10hexylphenothiazine-3,7-diyl); and an electrolyte layer comprising a solid ion-exchange polymer, the electrolyte layer interposed between the positive electrode layer and the negative electrode layer and configured to conduct ions therebetween, wherein the at least one electrochemical cell comprises at least a portion of one of a packaging, casing or containment of the device; and wherein at least one of the positive electrode layer or the negative electrode layer comprises a protective compound adapted to protect at least one of the first redox-active polymer or the second redox-active polymer from over-charging or over-discharging, and the protective compound is selected from the group consisting of a phenothiazine, iodine, tri-iodine, benzoquinone, naphthoquinone, and anthraquinone, their derivatives and combinations thereof.

12. The device of claim 11, wherein the device comprises an electric vehicle comprising a structural exterior body panel, wherein at least a portion of the structural exterior body panel comprises the at least one electrochemical cell integrated therein.

13. The device of claim 11, wherein the device comprises a portable computing device comprising a structural exterior casing, wherein at least a portion of the structural exterior casing comprises the at least one electrochemical cell integrated therein.

14. The device of claim 11, wherein a thickness of each of the positive electrode layer and the negative electrode layer is less than 200 μm.

15. The device of claim 11, wherein a thickness of the electrolyte layer is less than 100 μm.

16. The device of claim 11, wherein a total thickness of the at least one electrochemical cell is less than 500 μm.

17. The device of claim 11, wherein the solid ion-exchange polymer comprises at least one of polyethylene oxide (PEO), poly(siloxanes-g-oligo(ethylene oxide)), poly(trimethylene carbonate), poly(oxymethylene), poly(propylene oxide), poly(oxymethylene-oligo-oxyethylene), or poly(dimethyl siloxane).

* * * * *